(12) United States Patent
Shpeizer et al.

(10) Patent No.: US 7,297,321 B2
(45) Date of Patent: Nov. 20, 2007

(54) SUPERMICROPOROUS METAL OXIDES

(75) Inventors: Boris G. Shpeizer, Bryan, TX (US); Abraham Clearfield, College Station, TX (US)

(73) Assignee: The Texas A&M University System, College Station, TX (US)

( * ) Notice: Subject to any disclaimer, the term of this patent is extended or adjusted under 35 U.S.C. 154(b) by 143 days.

(21) Appl. No.: 11/033,102

(22) Filed: Jan. 11, 2005

(65) Prior Publication Data

US 2005/0152829 A1 Jul. 14, 2005

Related U.S. Application Data

(60) Provisional application No. 60/535,980, filed on Jan. 12, 2004.

(51) Int. Cl.
*C01G 1/00* (2006.01)
(52) U.S. Cl. ............. 423/592.1; 423/608; 423/594.17; 423/607; 423/594.19; 423/605; 423/632; 423/604; 423/622; 423/606; 423/263; 423/625; 423/335
(58) Field of Classification Search ............. 423/592.1, 423/608, 594.17, 607, 594.19, 605, 632, 423/604, 622, 606, 263, 625, 335; 502/300, 502/349, 353, 305, 325, 324, 345, 343, 303, 502/355; 252/184; 585/467
See application file for complete search history.

(56) References Cited

U.S. PATENT DOCUMENTS

2003/0095908 A1* 5/2003 Pinnavaia et al. .......... 423/335

OTHER PUBLICATIONS

J.S. Beck, et al., "A New Family of Mesoporous Molecular Sieves Prepared with Liquid Crystal Templates", J. Am. Chem. Soc., 1992, pp. 10834-10843,vol. 114.
C.T. Kresge, et al., "Ordered Mesoporous Molecular Sieves Synthesized by a Liquid Crystal Template Mechanism", Nature, 1992, pp. 710-712, vol. 359.
Q. Huo, et al., "Generalized Synthesis of Periodic Surfactant/Inorganic Composite Materials", Nature, 1994, pp. 317-321, vol. 368.
Q. Huo, et al., "Organization of Organic Molecules with Inorganic Molecular Species into Nanocomposite Biphase Arrays", Chem. Mater., 1994, pp. 1176-1191, vol. 6.
P.T. Tanev, et al., "Mesoporous Molecular Sieves Prepared by Ionic and Neutral Surfactant Templating", Chem. Mater., 1996, pp. 2068-2079, vol. 8.
T. Sun, et al., "Synthesis of Microporous Transition Metal Oxide Molecular Sieves with Bifunctional Templating Molecules," Angew. Chem. Int. Ed., 1998, pp. 664-667, vol. 37, No. 5.
T. Sun, et al., "Synthesis of Amorphous, Microporous Silica with Adamantanamine as a Templating Agent," Chem. Commun., 2000, pp. 2057-2058.
F. Schüth, "Non-Siliceous Mesostructured and Microporous Materials", Chem. Mater., 2001, pp. 3184-3195, vol. 13.
M. Wong, et al., "Supramolecular-Templated Synthesis of Nanoporous Zirconia-Silica Catalysts," Chem. Mater., 2002, pp. 1961-1973, vol. 14, No. 5, (published on Web Apr. 3, 2002).
C.L. Carnes, et al. in "Synthesis, Characterization and Absorption Studies of Nanocrystalline Aluminum Oxide and a Bimetallic Nanocrystalline Aluminum Oxide/Magnesium Oxide", Chem. Mater., 2002, pp. 2922-2929, vol. 14.
A. Clearfield, et al., "Organically Pillared Microporous Zirconium Phosphonates," J. Chem. Soc. Dalton Trans., 2002, pp. 2937-2947.
Z. Wang, et al., "Sulfonated Microporous Organic-Inorganic Hybrids as Strong Bronsted Acids," J. Am. Chem. Soc., 2003, pp. 10375-10383 vol. 125.

* cited by examiner

*Primary Examiner*—Timothy C. Vanoy
(74) *Attorney, Agent, or Firm*—Fish & Richardson P.C.

(57) ABSTRACT

A new class of supermicroporous mixed oxides, with pore sizes in the 10-20 Å range has been prepared utilizing basic metal acetates. The reactions are carried out in non-aqueous solvent media to which an excess of amine is added. Hydrolysis of the reagents is effected by addition of a water-propanol mixture and refluxing. The amine and solvent are removed by thorough washing and/or calcining at temperatures as low as 200° C. Mixtures of transition metal oxides with either $ZrO_2$, $TiO_2$, $La_2O_3$, $SiO_2$, $Al_2O_3$ or mixtures thereof were prepared. The surface area curves of the pure oxides are Type I with surface areas of 400-600 $m^2/g$ and up to 1100 $m^2/g$ for the mixed oxides.

24 Claims, 6 Drawing Sheets

SUPERMICROPOROUS METAL OXIDES

CROSS-REFERENCE TO RELATED APPLICATION

This application claims the benefit of U.S. Provisional Application No. 60/535,980 filed Jan. 12, 2004.

FIELD OF THE INVENTION

The present invention relates to methods for making mixed porous oxides, and more particularly relates, in one embodiment, to methods for making super-microporous metal oxides and the metal oxides so made.

BACKGROUND OF THE INVENTION

Zeolites are heavily used commercial products as ion exchangers, catalysts, and in separations technology. Their useful pore sizes are limited to 10 Å or less. In the past decade, many metal oxides have been prepared with pore sizes in the 20-200 Å range as seen in C. T. Kresge, et al., "Ordered Mesoporous Molecular Sieves Synthesized by a Liquid Crystal Template Mechanism", *Nature*, Vol. 359, 710-712 (1992) and J. S. Beck, et al., "A New Family of Mesoporous Molecular Sieves Prepared with Liquid Crystal Templates", *J. Am. Chem. Soc.* Vol. 114, 10834-10843, (1992). Several very specific cases with materials exhibiting pores 13-17 Å were demonstrated by Y. Ying et al. (please see T. Sun, et al., "Synthesis of Microporous Transition Metal Oxide Molecular Sieves with Bifunctional Templating Molecules," *Angew. Chem. Int. Ed.*, Vol. 37, No. 5, pp. 664-667, 1998; T. Sun, et al., "Synthesis of Amorphous, Microporous Silica with Adamantanamine as a Templating Agent," *Chem. Commun.*, pp. 2057-2058, 2000; and M. Wong, et al., "Supramolecular-Templated Synthesis of Nanoporous Zirconia-Silica Catalysts," *Chem. Mater.*, Vol. 14, No. 5, pp. 1961-1973, 2002, (published on Web Apr. 3, 2002). There is thus a gap between the two where very few materials have pore sizes in the 10-20 Å range.

Almost all microporous and mesoporous materials are made in aqueous media using amine or surfactant templates. Generally, the template is removed by heating to 500-550° C.

Intense research activity in the synthesis, structural elucidation and properties of mesoporous materials has resulted from the discovery of MCM-41 type mesoporous molecular sieves, Kresge, et al. and Beck, et al., id. and Q. Huo, et al., "Organization of Organic Molecules with Inorganic Molecular Species into Nanocomposite Biphase Arrays", *Chem. Mater.* Vol. 6, 1176-1191 (1994). By using surfactants with moderately long alkyl chain lengths, pores in the 20-50 Å range are routinely obtained. As noted, the most common preparative procedures involve the use of cationic or anionic surfactants and oppositely charged inorganic precursors, designated $S^+I^-$ or $S^-I^+$, respectively where S represents the surfactant and I the inorganic species, Huo, et al., id. A second pathway involves the use of neutral amine surfactants ($S°$) or nonionic polyoxyethylene surfactants ($N°$) with neutral inorganic precursors ($I°$) through hydrogen bonding at the interface of the pairs, as seen in P. T. Tanev, et al., "Mesoporous Molecular Sieves Prepared by Ionic and Neutral Surfactant Templating", *Chem. Mater.* Vol. 8, 2068-2079 (1996). Following these pioneering studies in the silica system mesoporous oxides of a large number of metals were prepared, F. Schüth, "Non-Siliceous Mesostructured and Microporous Materials", *Chem. Mater.* Vol. 13, 3184-3195 (2001) and Q. Huo, et al., "Generalized Synthesis of Periodic Surfactant/Inorganic Composite Materials", *Nature*, Vol. 368, 317 (1994). These oxides are generally not as thermally stable as the silica based products; collapse of the pore structure in many cases occurring at temperatures required for removal of the template. Titania and zirconia are special cases where the stability may be preserved to 550° C. by phosphate additions. The well known zeolites are more highly crystalline than the mesoporous materials but are limited in useful pore size to about 10 Å. A family of inorganic-organic hybrids with pores in the desired range was recently prepared, as noted by A. Clearfield and Z. Wang in *J. Chem. Soc. Dalton Trans.* 2002, pp. 2937-2947 (2002) and Z. Wang, J. Heising and A. Clearfield in *J. Am. Chem. Soc.* Vol. 125, pp. 10375-10383 (2003). These were zirconium phosphonates containing biphenyl groups. The phenyl rings can be sulfonated to produce very strong Bronsted acid catalysts.

Thus, it would be desirable if a way to produce supermicroporous metal oxides having pore sizes in the 10-20 Å range.

SUMMARY OF THE INVENTION

Accordingly, it is an object of the present invention to provide supermicroporous metal oxides having pore sizes in the 10-20 Å range.

It is another object of the present invention to provide supermicroporous metal oxides having pore sizes where the pore size could be adjusted to be between about 8-25 Å.

Another object is to provide supermicroporous metal oxides of this invention suitable as catalysts.

In carrying out these and other objects of the invention, there is provided, in one form and/or in preferred embodiment, a method for preparing supermicroporous metal oxides that involves combining a metal salt in the presence of a carboxyl anion to form a mixture, and adding into the mixture an amine to form either a homogeneous solution or a thixotropic gel. In one non-limiting embodiment, all salts are added prior the addition of the hydrolyzing agent. The mixture is hydrolyzed by either water contained in the reagents or by adding water or water diluted with solvent to the mixture. The mixture is stirred for an extended period of time and/or refluxed, and optionally hydrothermally treated, and the supermicroporous metal oxide is obtained by collecting and drying a solid from the mixture. The invention also relates to supermicroporous metal oxides made by this method.

In another non-limiting embodiment of the invention, there are supermicroporous metal oxides made by this process, which can form the basis for a catalyst, or which are useful in separation processes, or as ion exchangers.

BRIEF DESCRIPTION OF THE DRAWINGS

FIG. 1 shows $N_2$ sorption-desorption isotherms (A) and pore size distributions (B) for microporous chromium oxide; calcination temperatures ° C. utilized prior to measurement are indicated by the symbols 190, ♦; 250, ■; 320, ▲; 410, ●, respectively;

FIG. 2 includes graphs of $N_2$ sorption-desorption isotherms (A) and corresponding pore size distribution (B) for a chromia-zirconia sample prepared by the reflux method herein; calcination temperatures (° C.) are indicated by the symbols 190, ♦; 340, ■; 520, ▲; 613, ●, respectively;

FIG. 3 includes graphs of $N_2$ sorption-desorption isotherms (A) and corresponding pore size distributions (B) for chromia-zirconia sample prepared hydrothermally; calcination temperatures (° C.) are indicated by the symbols 190, ♦; 340, ■; 520, ▲; 613, ●, respectively;

FIG. 7 shows nitrogen sorption/desorption isotherms for the copper oxide-silica-alumina composite (A) samples 1 and 2 stirred at r. t. for 10 min and 21 hrs, respectively; and (B) samples 3, 4, 5 refluxed for 10 min, 90 min and 24 hrs, respectively.

DETAILED DESCRIPTION OF THE INVENTION

A new class of microporous mixed oxides, with pore sizes in the 10-20 Å range has been prepared utilizing basic metal acetates and/or other metal salts in the presence of acetate or other carboxy anions. The reactions in most of non-limiting cases are carried out in alcohol media to which an amine is added. In several non-limiting cases the supermicroporous products were obtained directly from solvent-free reaction mixtures. The initial hydrolysis and/or polymerization is effected by the water molecules present in the starting materials. Further hydrolysis and/or polymerization of the reagents is effected by addition of a water/water-solvent mixture followed by vigorous stirring and/or refluxing, and/or hydrothermal synthesis. The hydrolysis may be further effected by addition of bases such as, but not limited to, an amine or ammonia or mixtures thereof. The amine and solvent are removed by thorough washing and/or calcining at temperatures as low as 200° C. In several non-limiting cases no washing was applied to the products, and the volatiles were removed by calcination. Mixtures of transition metal oxides with either $ZrO_2$, $SiO_2$, $La_2O_3$, $TiO_2$ and/or $Al_2O_3$ or mixtures thereof were prepared and while the $Cr_2O_3—ZrO_2$ system is described in detail here the selected examples of other systems will also be provided. The procedures for the other systems would correspond to the one described. In one non-limiting embodiment of the invention, the surface area of the supermicroporous metal oxides of the invention range from about 200 to about ~1100 $m^2/g$. The surface area curves of the pure oxides are Type I with surface areas of 400-600 $m^2/g$ for the individual oxides. However, the oxides so prepared likely tend to lack thermal stability as the pore size increases with increased calcination temperature and collapse of the walls for some of the systems occurs above 400° C. Addition of phosphate improves the stability slightly, but the thermal stability is greatly improved by preparing mixed oxides of transition metals in zirconia or silica, titania, $La_2O_3$, and $Al_2O_3$ or mixtures thereof. Type I isotherms are obtained to ~450° C. and in some cases to 900° C. and above. There is a tendency to increase pore size with an increase in calcination temperature and on calcining above 500° C. a significant amount of mesopores may be formed. Hydro-thermal treatment accelerates the trend towards larger pores. In some cases, the pore limit can be lowered to 8 Å or raised to 25 Å.

A goal was to fill the gap between the two types of well known porous materials by synthesizing oxides with pores in the 10-20 Å range. The inventors have discovered the synthesis of a family of oxides with supermicropores, that is, containing pores in the 10-20 Å range. The inorganic precursors are metal acetates and/or other metal salts in the presence of corresponding carboxy anion and the surfactant is propylamine, butylamine, hexylamine or octylamine, although other amines including those of larger carbon chains have been successfully employed. The reactions in many non-limiting embodiments were carried out in alcohol-water mixtures in the presence of amount of amine sufficient to effect the hydrolysis of the metal salts. The general procedure is to add the metal acetate to a non-aqueous solvent, generally an alcohol and stir until the solid is uniformly distributed. Then amine is added and after stirring for 30-60 minutes finely ground $(NH_4)_2HPO_4$ and/or $H_3PO_4$ is optionally added. An additional amount of amine is optionally added and stirring continued for several hours preferably overnight to achieve either a homogeneous solution or a thixotropic gel in the case of zirconium, lanthanum, titanium, or mixtures thereof. Then water diluted with alcohol is slowly added with stirring. After all the water-propanol mixture is added, the mixture is refluxed overnight and/or hydrothermally treated or in some cases stirred for extended periods of time. The solid is then collected by filtration, washed thoroughly with alcohol and dried at as low as 55° C. Similar experiments were carried out where the mixture was treated hydrothermally at temperatures up to 200° C. in addition to/or in place of refluxing.

More generally, suitable metal salts for the method of this invention include, but are not necessarily limited to, tetraethyl orthosilicate, titanium acetate or propoxide, vanadium acetate, vanadium phosphate, vanadium sulfate, chromium acetate and nitrate, zirconium acetate, zirconium oxochloride and propoxide, niobium acetate, molybdenum acetate, lanthanum acetate, aluminum tri-sec-butoxide, aluminum nitrate, nickel acetate, manganese acetate, iron acetate, zinc acetate, copper acetate, cobalt acetate and/or nitrates and/or chlorides or mixtures thereof. If salts other than acetates are employed the addition of appropriate salt containing acetate or other carboxy anion and/or corresponding acid is sufficient.

In one non-limiting embodiment of the invention, suitable solvents include, but are not necessarily limited to, propanol, isopropanol, butanol, ethanol, methanol, pentanol, heptanol, and mixtures thereof.

With respect to suitable amine templates, appropriate amines in one non-limiting embodiment of the invention are neutral amines having from 1 to 18 carbon atoms. In an alternate, non-limiting embodiment suitable amines include, but are not necessarily limited to, methylamine, propylamine, butylamine, hexylamine, octylamine, trimethylammonium compounds, tetrabutylammonium, dipropylamine, tripropylamine, and mixtures thereof.

In the method of this invention, the ratio of the amine to the solvent should be sufficient to effect a high degree of salt hydrolysis, and in one non-limiting case may range from about 0.91 mol:8.41 mol to about 0.039 mol:8.38 mol preferably from about 0.089 mol:6.52 mol to about 0.39 mol:11.13 mol. In another non-restrictive embodiment, the ratio of solvent to amine ranges from about 0.1:8.0 to about 200:1. In the case where a thixotropic gel is formed, the gel may be aged for a period of time between about 3 hours and about 96 hours prior to reflux (if necessary); in another non-limiting embodiment from about 6 to about 96 hours. As noted, the mixture may be optionally treated hydrothermally in addition to or in place of the refluxing step.

Further in the method of the invention, the collecting and drying of the solid mixed metal oxides from the mixture to form the supermicroporous metal oxides may be conducted by any conventional technique known to those skilled in the art. In a particular non-limiting embodiment of the invention, the drying is conducted at a temperature in the range of about 45 to about 180° C. in an alternate, non-limiting embodiment from about 45 to about 110° C., preferably from about 55 to about 100° C. Calcining may be subsequently performed at a temperature ranging from about 180 to about 900° C., preferably from about 200 to about 600° C., and in an alternate, non-limiting embodiment from about 190 to about 650° C.

Figure 1A:
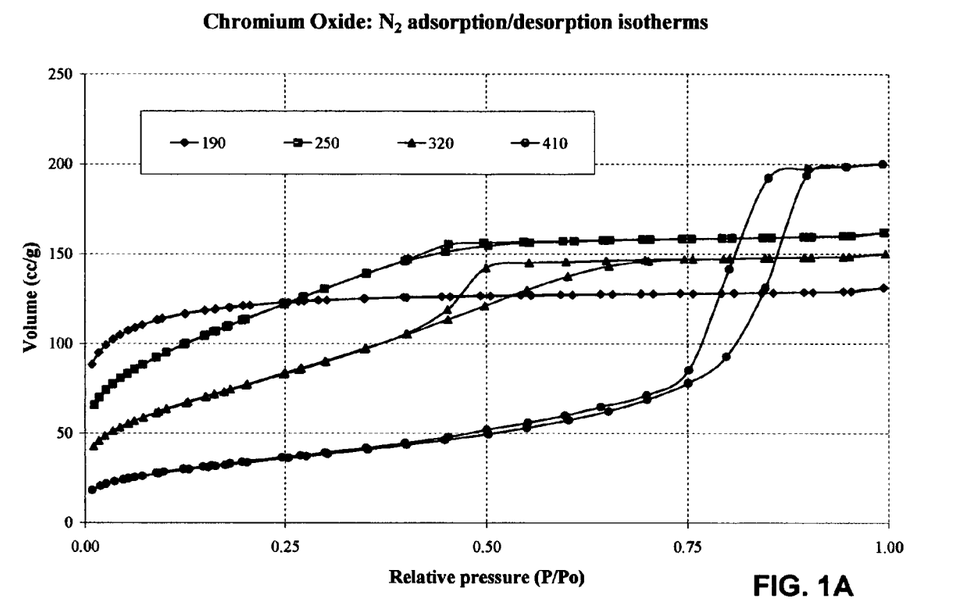
Figure 1B:
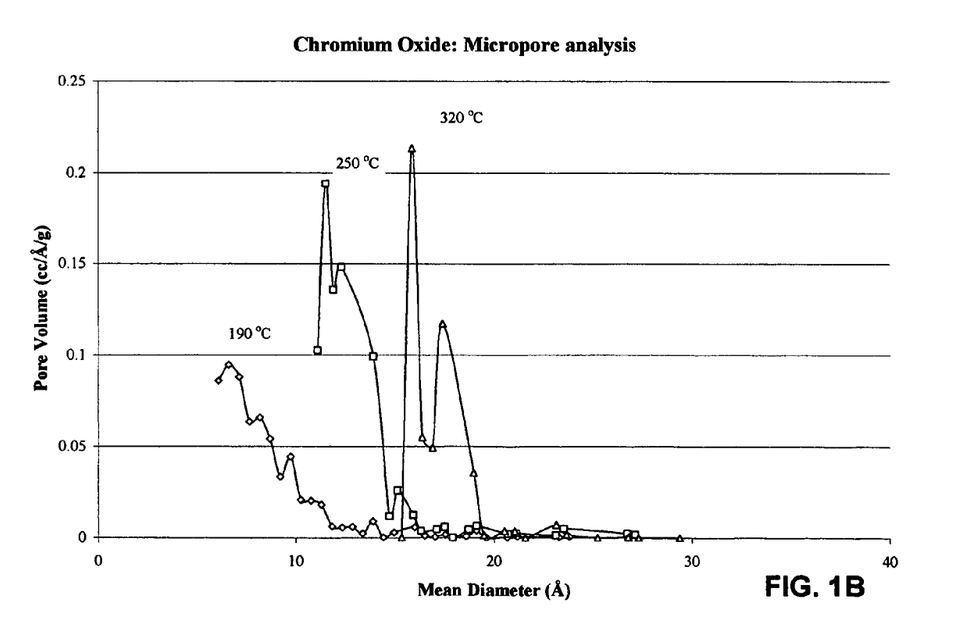

The nitrogen sorption-desorption isotherms for chromia prepared from a refluxed sample of $(CH_3CO_2)_7Cr_3(OH)_2$ (Example No I) heated at different temperatures for 24 hours are shown in FIG. 1A and the pore sizes derived from the isotherms are presented in FIG. 1B. All the samples were outgassed at 180° C. for 22 h. The data are summarized in Table 1. The samples of A preheated at 190° and 250° C. yielded Type I isotherms representative of microporous materials. The pore size distribution for the 190° sample is 6.5-11 Å and for the 250° C. sample the pores are centered at a maximum of 11-14 Å. Further preheating to 320° C. changes the character of the isotherm to that of a mixed micro-mesoporous solid. However micropores still account for most of the surface area (S.A.) with pores centered at 16 Å diameter together with a second group at 18 Å. Heating to 410° C. converted the sample to one with non-descript or broad ranging mesopores with loss of more than half the surface area. The hydrothermally treated sample designated as B in Table 1, showed the same trends on heat treatment, had overall larger surface areas, and larger pore sizes but collapsed to a broad spectrum of mesopores between 250°-320° C.

TABLE 1

BET and Micropore Surface Area for Chromium Oxide, Sample A Prepared by Refluxing and B by Hydrothermally Treated and Calcined at Different Temperatures

| Calcination temperature (° C.) | BET Surface Area (m²/g) | | t-Method micropore surface area (m²/g) | | t-Method micropore volume (cm³/g) | | Main pore size (Å) | |
|---|---|---|---|---|---|---|---|---|
| | A | B | A | B | A | B | A | B |
| 190 | 439 | 614 | 436 | 591 | 0.195 | 0.438 | 6.5-11 | 14.8 |
| 250 | 409 | 490 | 404 | 420 | 0.240 | 0.441 | 11-14 | 18.5 |
| 320 | 275 | 358 | 270.6 | 295.6 | 0.219 | — | 16-18 | 56.8* |
| 410 | 121 | 172 | — | — | — | — | 95.6* | 122* |

*BJH method used for pore distribution determination.

X-ray powder patterns showed the samples to be completely amorphous. Upon drying at 55° C., the solids contain about 18% carbon attributed to hexylamine, propanol and a small amount of acetyl groups. A TGA curve showed a weight loss of about 13% to 190° C. The bulk of the organic is then lost (about 30-32%) from 190° to 260° C. An additional weight loss to 900° C. of 8% takes place in two steps, 5% from 260° to 340° C. and the remainder from 520° to 600° C. The hydrothermally treated sample behaved similarly, but the overall weight loss was ~42% or about 10% less than the refluxed sample. Heating under isothermal conditions at 250° C. removes most of the organic, but the pores are mesoporous.

Because mesoporous zirconia was previously reported to be more stable than most mesoporous oxides and because zirconium has a very stable four plus oxidation state, reactions of the type described above for zirconia were carried out using a basic zirconium acetate $Zr(OH)_{4-x}(CH_3COO)_x$, x=1.36. The porosity of the resultant hydrous zirconia was not at all like that of the chromia. Even the sample dried at 190° C. exhibited a Type IV isotherm and the shape of the desorption curve near $P/P_0$=0.5 indicated a broad distribution of pore sizes. A second sample of zirconia did give a Type I isotherm with a S.A. of 284 m²/g when heated treated at 260° C. The pore size distribution was narrow with a maximum in the volume versus mean diameter curve of 10 Å. This sample lost surface area rapidly with increasing temperatures and the pore structure collapsed at ~350° C. The use of reduced amounts of water employed for the hydrolysis yielded a substantially more thermally stable product. In one non-limiting embodiment the product calcined at 600° C. exhibited Type I adsorption/desorption isotherm and retained its microporous structure with the maximum on the pore size distribution curve at ~11 Å.

A mixture of basic acetates 37 mol % Cr and 63 mol % Zr was prepared as before in propanol to which was added sufficient hexylamine and a solution of diammonium hydrogen phosphate. The mole ratio Zr:Cr:P was 1:1.80:0.58. Sufficient water in propanol was added to hydrolyze the acetates to their respective hydrous oxides. Because the basic chromium acetate contains three Cr per molecule the final mixture of $Cr_2O_3+ZrO_2$ was in the mol ratio of 47/53 mol %. The surface areas and pore sizes are shown in and the isotherms in FIG. 3A and FIG. 3B, respectively. The isotherms for the refluxed sample (Example No III) are of Type I, characteristic of micropores. Isotherms of this type persisted up to preheating temperatures of 460° C. with the bulk of the pores between 10 and 15 Å. Preheating to 520° C. and above changed the shape of the isotherms to Type IV as the average pore size increased but remained in a narrow-range.

TABLE 2

BET and Micropore Surface Areas for Chromia-Zirconia Samples A (refluxed) and B (hydrothermal) Calcined at Different Temperatures

| Calcination temperature (° C.) | BET surface area (m²/g) | | t-Method micropore surface area (m²/g) | | Main pore size (Å) | |
|---|---|---|---|---|---|---|
| | A | B | A | B | A | B |
| 190 | 559 | 630 | 556 | 608 | 8.7 | 14.4 |
| 250 | 501 | 555 | 498 | 541 | 9.2 | 15.6 |
| 320 | 435 | 501 | 432 | 477 | 9.3 | 15.6 |
| 410 | 384 | 365 | 381 | 336 | 9.8 | 17.1 |
| 460 | 326 | 287 | 323 | 261 | 10.8 | 17.1 |
| 520 | 239 | 277 | 234 | 259 | 12.8 | 19.1 |
| 567 | 207 | 262 | 200 | — | 16.5 | — |
| 613 | 151 | 173 | 144 | — | 16.9 | — |

Figure 2A:
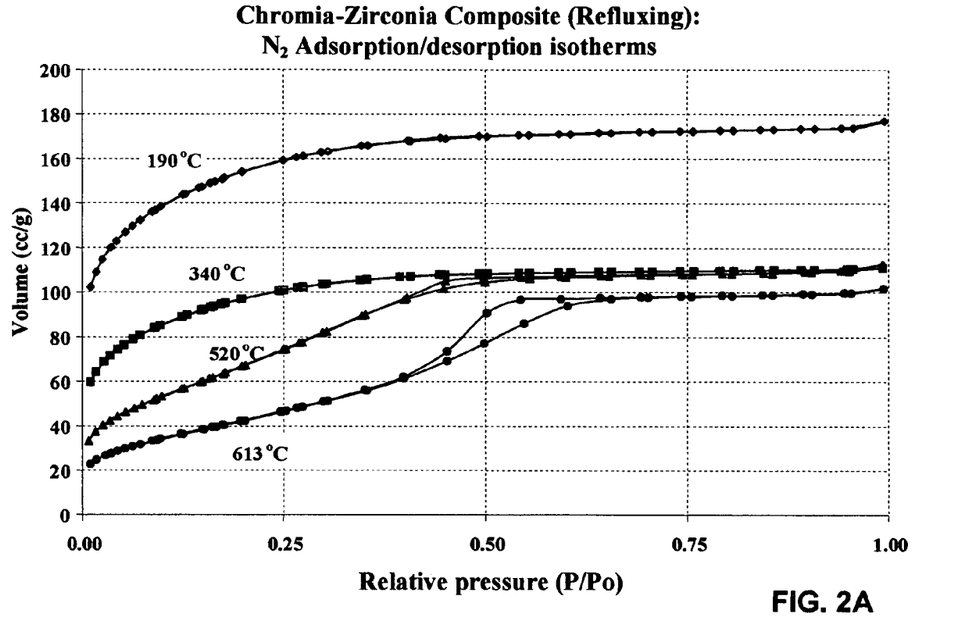
Figure 2B:
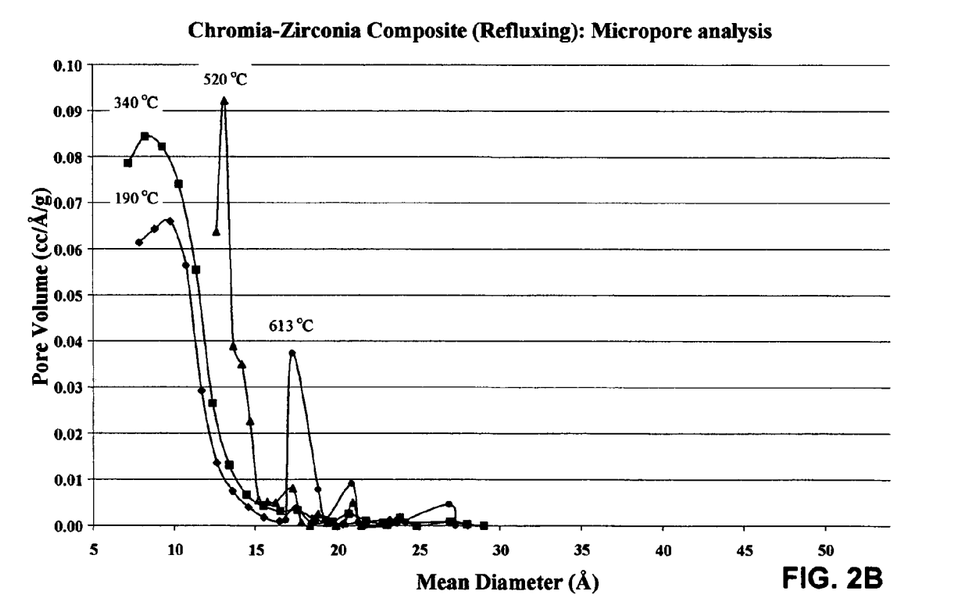
Figure 3A:
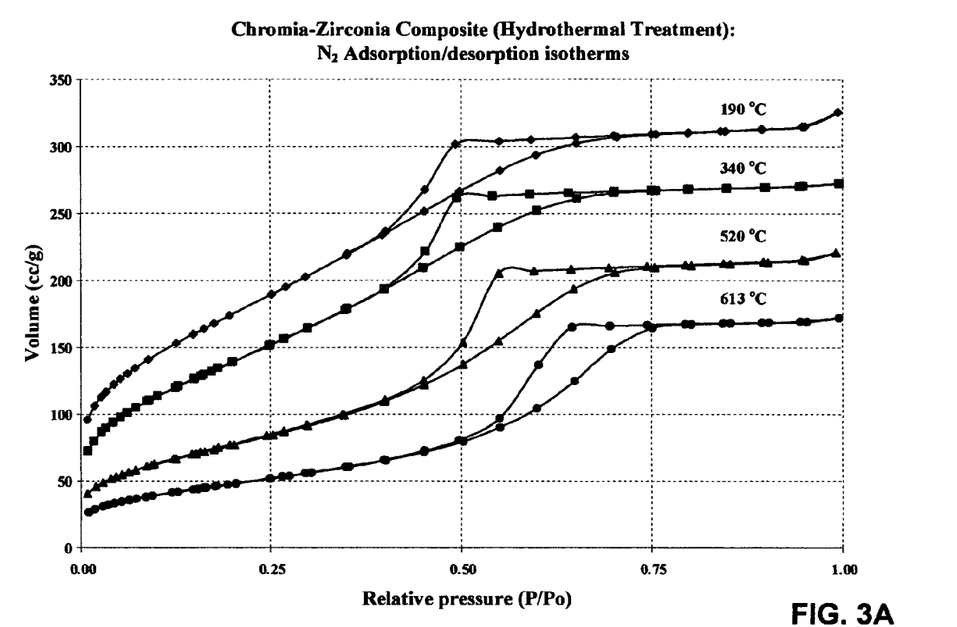
Figure 3B:
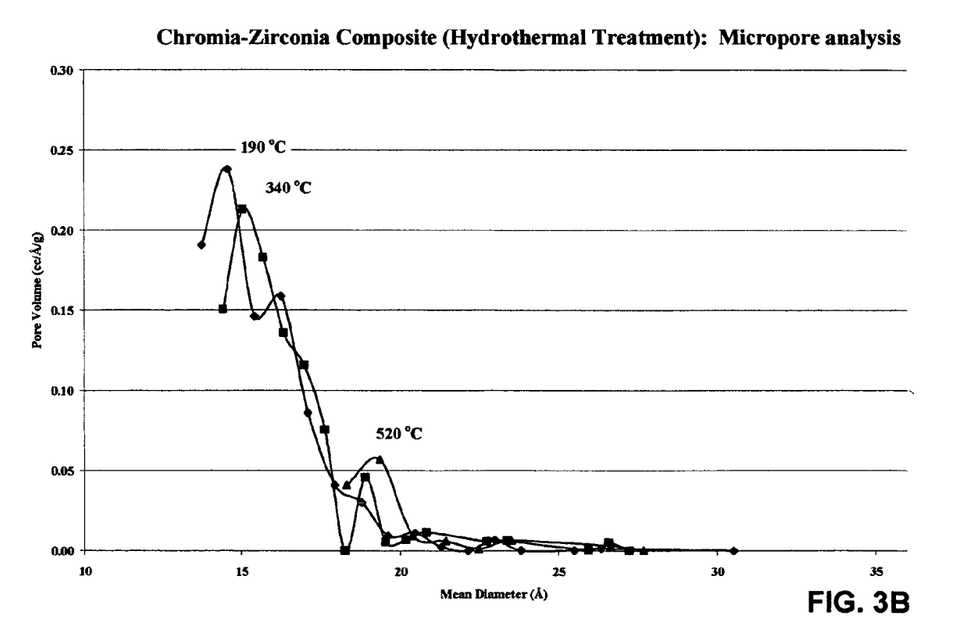

The effect of hydrothermal treatment is to produce somewhat larger surface areas and larger pores. The shape of the isotherms in the FIG. 3A is indicative of a bimodal pore structure of micro and mesopores with a hysteresis feature. However, the t-plot method indicated that the bulk of the pores are in the micropore region up to a preheating temperature of 520° C. (see FIG. 3B). Heating above that temperature yielded solids with a broad distribution of mesopores. Note that the desorption region of the isotherms near $P/P_0=0.5$ are curved in a shape recognized as tensile pressure This means that the mesopores are likely to have a much broader range than is indicated in FIGS. 2B and 3B.

Figure 4:
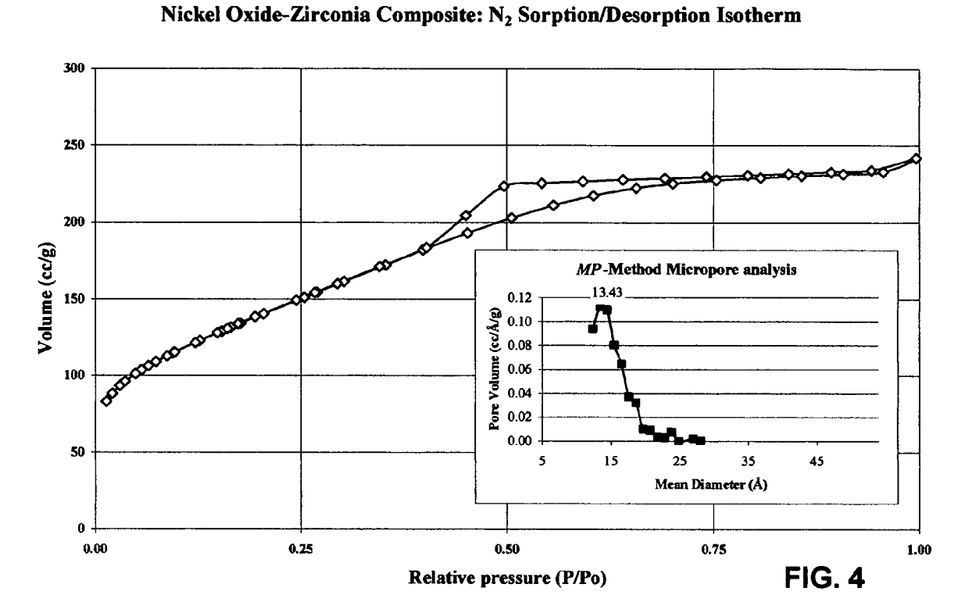
FIG. 4 is a graph of $N_2$ adsorption/desorption isotherm of a mixed $NiO—ZrO_2$ solid having a surface area of 508 $m^2/g$; the inset gives the pore size distribution after heating to 252° C.

Subsequently the mole ratio Zr/Cr was changed to as high as 2.34 with results very much like those reported for the much higher loading of chromium reported above. The outcome with a wide variety of other transition elements mixed with zirconia gave similar results to the chromium system, stability was maintained to above 500° C. and the pore sizes were in the 10-20 Å range. There were also produced a series of mixed silica-transition metal oxides with similar characteristics to the zirconia based materials. An isotherm of the $SiO_2$—NiO system is shown as FIG. 4. The S.A. is 508 $m^2/g$ with the mean pore diameter at 13.4 Å.

In the control of the type of porosity as well as the pore size distribution the parameters altering these properties include, but not limited to, the choice of templating amine, solvent and amounts thereof; ratio of the starting reagents, time of reaction and its temperature, amounts of water added and the concentrations of water in the solution been added.

EXAMPLES OF PREPARATION OF POUROUS OXIDES

Example No I

Preparation of Chromium Oxide-Refluxed 18.2 g of chromium acetate, $Cr_3(CH_3COO)_7(OH)_2$, was added to 380 g (473 ml) of n-propanol and stirred for 30 min. Then, 26 g of hexylamine, $C_6H_{13}NH_2$, was added with stirring to produce a clear solution. Next, 1.42 g of $(NH_4)_2HPO_4$ was added as a solid followed by a mixture of 139 g propanol plus 138 g $H_2O$. This mixture was refluxed for 3 days to obtain a bright green powder, 7.86 g. If all the phosphate and chromium were recovered as oxide-phosphate, the yield would be 8.04 g and with one mole of $H_2O$ per mol of Cr, 8.58 g. Thus the yield is 91-97%. The surface areas and pore sizes of this chromium oxide are given in Table 1 as sample A. The sample was stable to ~350° C.

Example No II

Chromium Oxide—Hydrothermal Reaction

A second experimental mixture was prepared as described in Example I except that the mixture was placed inside a Teflon-lined pressure vessel and heated for 3 days at 170° C. The results are summarized in Table 1 as sample B.

Table 1 shows that the surface areas and pore sizes are larger for the hydrothermally treated sample but the pore structure has collapsed into a system of mesopores at about 300° C. The refluxed sample collapsed at ~350° C.

Example No III

Chromium-Zirconium Oxides-Phosphate 18.18 g of chromium acetate and 10.80 g of zirconium acetate, $Zr(OH)_{2.64}(CH_3COO)_{1.36}$, were added to 490 g of propanol (610 ml) with stirring. Stirring was continued while 26 g of hexylamine followed by 3.9 g of $(NH_4)_2HPO_4$ was added. This mixture was stirred overnight and then a mixture of 146 g propanol and 145 g $H_2O$ was added dropwise with stirring. This mixture was then refluxed for 3 days, cooled and washed with additional ethanol to remove the amine. The dried solid yield was 18 g. The surface area (S.A.) and pore diameters of the resultant solid heat treated at the temperatures indicated were as shown in Table 2 (Sample A). It is seen that while the surface area decreases with increase in heating temperature there is no collapse of the structure to 613° C. The pore size increases with increase in heating temperature. Thus the mixture of $ZrO_2$—$Cr_2O_3$ is more stable than chromia without the $ZrO_2$.

Example No IV

Hydrothermal Treatment of Example No III Material

A very similar mixture as that described in Example No. III was treated hydrothermally for 3 days at 170° C. and otherwise treated as described in Example III. The results in Table 2 (Sample B) show that indeed the S.A. and pore diameters are larger but the stability is poorer, collapse coming at about 530-540° C.

Example No V

Cr—Zr but No Phosphate

In this example the quantities used were 10.62 g chromium acetate, 18.24 g zirconium acetate, 26.71 g hexylamine, 380 g propanol, but no $(NH_4)_2HPO_4$. The procedure was as described as in Example No IV with the final addition being a mixture of 271 g propanol+271 g $H_2O$. Reflux was for 3 days. The S.A. and pore sizes were as follows:

| T° C. | S.A. ($m^2/g$) | Pore diameter (Å) |
|---|---|---|
| 252 | 441 | 10 |
| 414 | 383 | 10 (5%-17 Å) |
| 522 | 180 | 16 (10%-25 Å) |

The omission of phosphate decreases the stability of the mixed oxide by about 50-80° C. However, this oxide mix is still useful for catalysis.

Example No VI

NiO—$ZrO_2$—$PO_4$ 26.08 g of nickel acetate, $Ni(CH_3COO)_2.4H_2O$, and 10.90 g of zirconium acetate were added to 260 g of propanol and stirred while adding 33.4 g of hexylamine. The mixture was stirred for 1 hour followed by addition of 5.94 g of $(NH_4)_2HPO_4$. After stirring for 2 h a 50-50 mixture of water and propanol (366 g total) was added followed by refluxing for 3 days. The solid was recovered by filtration washed with excess ethanol and heated at 45° to dryness. This sample gave the following S.A. and pore sizes:

| T° C. | S.A. ($m^2/g$) | Pore diameter (Å) |
|---|---|---|
| 175 | 458 | 15 |
| 408 | 272 | 16 |
| 504 | 201 | 15-20 |

Example No VII

Cr₂O₃—TiO₂—PO₄

13.5 g of chromium acetate and 24.3 g of titanium isopropoxide, Ti(C₃H₇O)₄, were added to 150 g of propanol with stirring. Then 26.24 g of hexylamine was added along with 5.22 g of (NH₄)₂HPO₄. The mixture was stirred overnight and then a mixture of 159 g of propanol and 271 g of H₂O was added dropwise while refluxing. Refluxing was continued for 3 days, the mixture cooled, washed with ethanol and then dried at 45° C. The heated oxide mix gave the following texture results:

| T° C. | S.A. (m²/g) | Pore diameter (Å) |
|---|---|---|
| 175 | 425 | 9-10 |
| 408 | 374 | 14 |
| 504 | 161 | 19 |

Example No VIII

CuO—ZrO₂—PO₄

5.60 g of Cu(CH₃COO)₂·H₂O and 16.19 g of zirconium acetate were added to 480 g of propanol and stirred for 1 h. Then 36.28 g of hexylamine was added with stirring resulting in a development of a deep blue color. Solid (NH₄)₂HPO₄, 2.60 g, was then added and a mixture of 228 g H₂O and 228 g propanol added dropwise and the mixture stirred overnight. This mixture was refluxed for 3 days. The recovered oxide mixture gave the following results:

| T° C. | S.A. (m²/g) | Pore diameter (Å) |
|---|---|---|
| 180 | 396 | 10-22 (broad) |
| 252 | 292 | 10-22 (broad) |
| 414 | 199 | 12 (broad) |
| 522 | 165 | 14-15 (broad) |
| 650 | 14.5 | — |

Example No IX

Silica-Nickel Oxide+Phosphate 26.0 g of nickel acetate and 10.8 g of tetraethylorthosilicate, Si(OC₂H₅)₄, were added to 250 g of propanol with stirring. To this mix was added 36.14 g of hexylamine followed by 6.0 g of (NH₄)₂HPO₄ (ammonium monohydrogenphosphate). The whole was stirred overnight and then 447 g H₂O in 288 g propanol was added dropwise while stirring. The whole was then refluxed for 3 days, cooled, and the solid collected by filtration, washed and dried. The results were:

| T° C. | S.A. (m²/g) | Pore diameter (Å) |
|---|---|---|
| 252 | 507 | 14 |
| 414 | 574 | 15-20 |
| 522 | 441 | 17-22 |
| 650 | 383 | 17-22 |
| 750 | 206 | 18-22 |

Example No X

Lanthanum-Copper Oxides 18.13 g of lanthanum acetate and 26.30 g of copper acetate were added to 316.5 g of isopropanol with stirring. To this mixture was added 57.26 g of hexylamine. The mixture was stirred for 72 hrs and then 424.16 g H₂O in 576.28 g isopropanol was added dropwise while stirring. The mixture was then stirred for 24 hrs, cooled, and the solid collected by centrifuging, washed and dried. The results were:

| T° C. | S.A. (m²/g) | Pore diameter (Å) |
|---|---|---|
| 224 | 86.8 | 8-20 |

Example No XI

Palladium on Zirconia 13.10 g of zirconium acetate was added to 216.11 g of propanol with stirring. To this mix was added 27.09 g of hexylamine. The mixture was stirred for 50 min and solid (NH₄)₂HPO₄, 2.30 g, was then added. After ~30 minutes of additional stirring 3.65 g of 10% Pd(NH₃)₄(NO₃)₂ in H₂O in 16.3 g H₂O in 147 g propanol was added and 5 minutes later an additional 126.18 g propanol was added to the forming gel. Twenty-four hours later 270.81 g H₂O in 234.69 g propanol was added dropwise very slowly over period of 48 hours while stirring. The mixture was then refluxed for 96 hrs, cooled, and the solid collected by centrifuging, washed and dried. The results were:

| T° C. | S.A. (m²/g) | Pore diameter (Å) |
|---|---|---|
| 180 | 461.7 | 11-27 |
| 252 | 447.0 | 10-28 |
| 380 | 337.2 | 8-26 |
| 522 | 272.2 | 10-28 |
| 650 | 217.2 | 12-30 |

This material proved to be an efficient catalyst, e.g. in the Heck reaction in which styrene was converted to stilbene in 95-98% yield. Through a similar procedure a platinum doped zirconia was also obtained.

Example No XII

NiO—SiO₂—Al₂O₃; Illustrating the Effect of the Amount of Water Added on the Material's Porosity The solution of the following composition was prepared by dissolving 18.40 g of Ni(CH₃COO)₂·4H₂O, 3.31 g of Al(OCH(CH₃)C₂H₅)₃ and 60.52 g of Si(OC₂H₅)₄ in 191.3 g of propanol containing 52.20 g of hexylamine. After all the solids were dissolved, the solution was divided into three parts to which the water diluted in propanol was added. The details are summarized in Table 3.

TABLE 3

The Details of the Synthesis

| | Solution Weight (g) | Amount of water added (g) | BET Surface Area $m^2/g$ | Pore Diameter (Å) |
|---|---|---|---|---|
| A | 103.5 | 13.70 | 746 | 9.7-26 |
| B | 110.0 | 26.34 | 820 | 10.4-26 |
| C | 108.6 | 40.00 | 859 | 12.0-26 |

Figure 5:
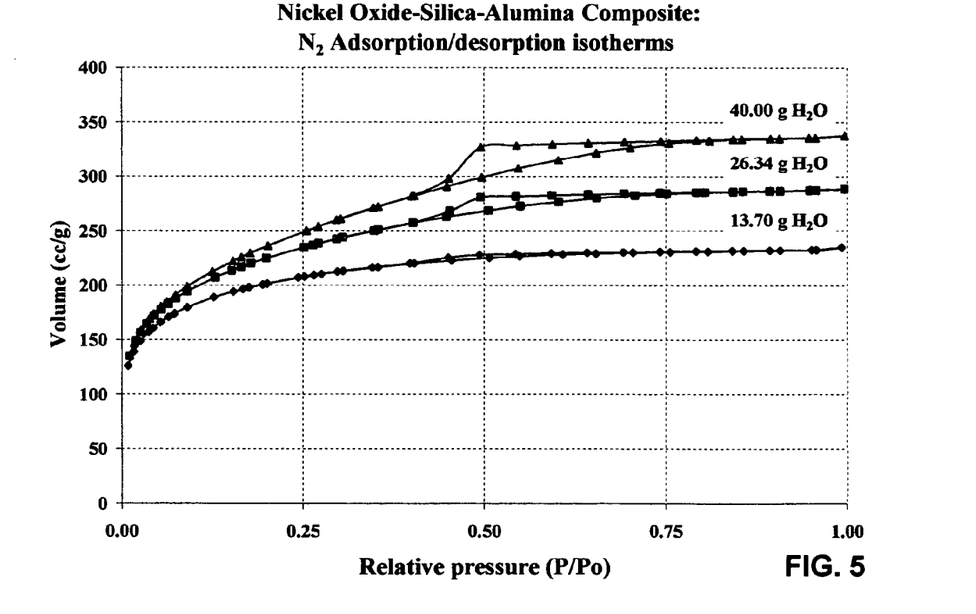
FIG. 5 presents nitrogen sorption/desorption isotherms for the samples calcined at 510° C. showing the effect of amount of water used in the hydrolysis of the gel on the $NiO—Al_2O_3—SiO_2$ mixed porous oxide isotherms and porosity (Example No XII)

The nitrogen sorption/desorption isotherms for the samples A, B, and C shown in FIG. 5 illustrate the fact that large amounts of water added shift the porosity from clearly Type I isotherm for the smallest amounts added to the mixed Type I/Type IV isotherms for materials synthesized with larger amounts of water.

Example No XIII

Figure 6:
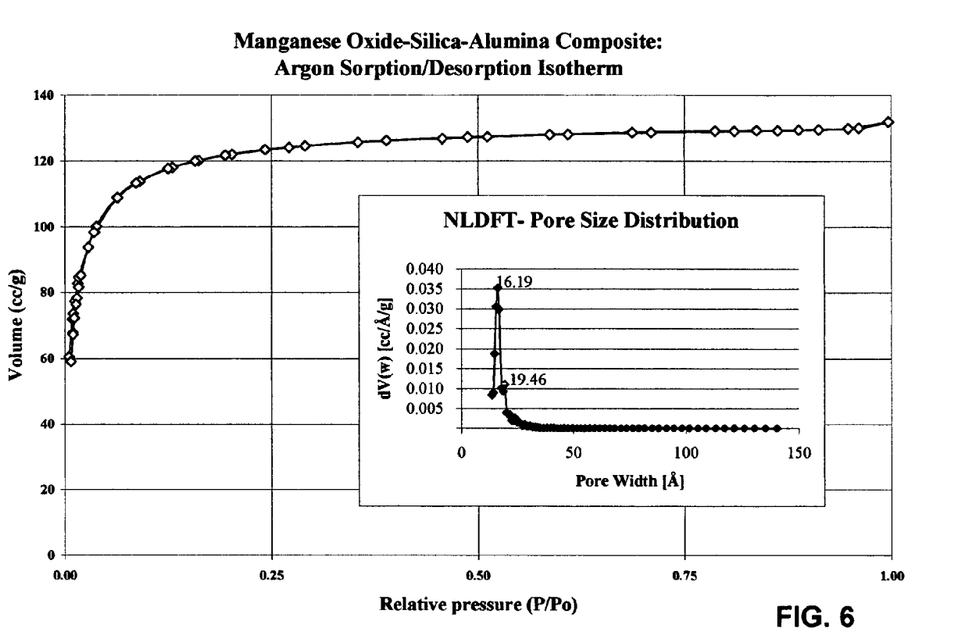
FIG. 6 presents the argon sorption/desorption isotherm and NLDFT (Non-Local Density Functional Theory) equilibrium pore size distribution for the $ZnO—Al_2O_3—SiO_2$ sample calcined at 390° C. (Example No XIII)

The starting solution for the synthesis of the Sample had the following composition: 11.91 g of $Zn(CH_3COO)_2.2H_2O$, 53.50 g of $Si(OC_2H_5)_4$, 2.67 g of $Al(OCH(CH_3)C_2H_5)_3$, 13.07 g butylamine. To prepare the Sample 1.04 g of $H_2O$ were added to 36.22 g of the starting solution. The solution obtained was aged for 24 hrs and dried as made at 139° C. The porosity of the sample obtained was characterized via argon adsorption. The corresponding isotherm and NLDFT equilibrium pore size distribution are shown in the FIG. 6 for which the BET surface area was 432 $m^2/g$.

Example No XIV

Figure 7A:
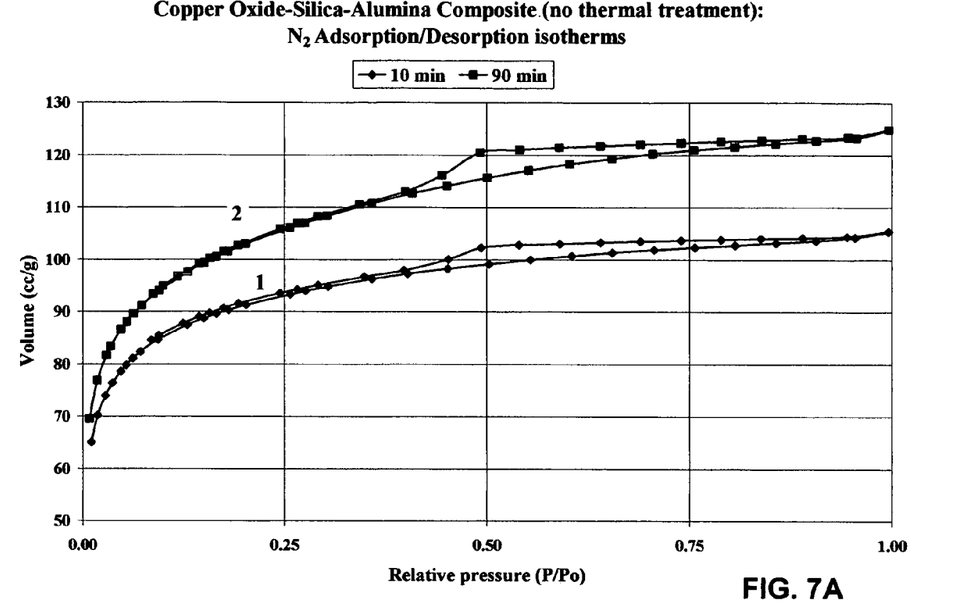
Figure 7B:
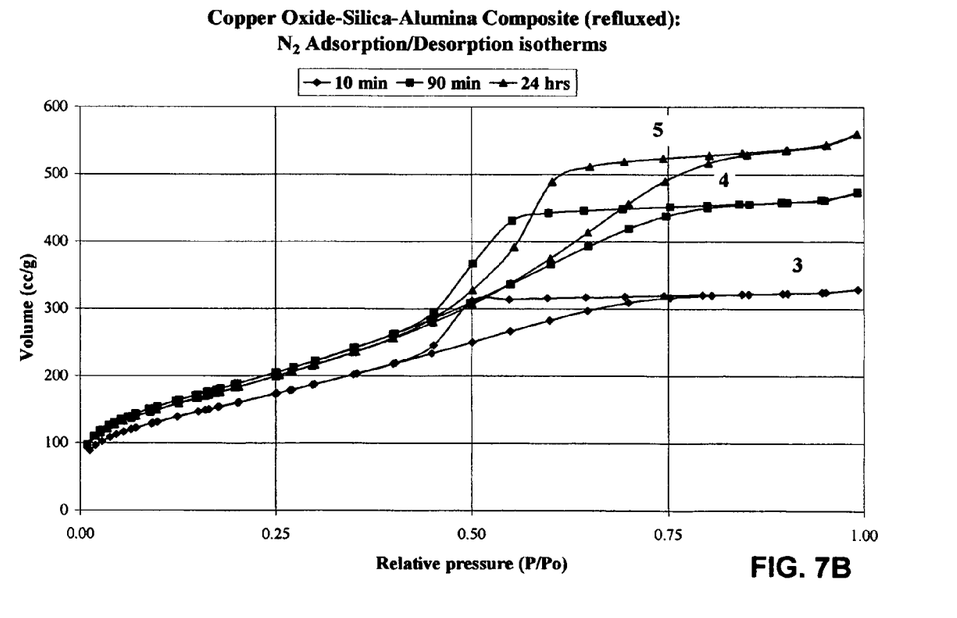

This example indicates the effect of time of reaction after water was added. 13.06 g of $Cu(CH_3COO)_2.4H_2O$, 26.61 g of $Si(OC_2H_5)_4$, 6.02 g of $Al(OCH(CH_3)C_2H_5)_3$, were dissolved in the solution containing 56.92 g of propyl alcohol and 39.39 g of hexylamine. After 2 hrs of vigorous stirring once all solids were dissolved, 13.50 g of D.I. water in 103.4 g of propanol were added and the solution was left stirring overnight. To the solution obtained, water/propanol mixtures were gradually added in the following quantities: 36.08 g $H_2O$ in 78.53 g propanol; 54.94 g $H_2O$ in 65.24 g propanol; 78.16 g $H_2O$ in 36.52 g propanol; 103.42 g $H_2O$ in 18.30 g propanol; 126.69 g $H_2O$; 128.30 g $H_2O$. Sample 1 and 2 were taken after 10 min and 21 hours of stirring respectively. The nitrogen adsorption/desorption isotherms for the samples calcined at 360° C. are shown in FIG. 7A. The gel was brought to refluxing and the samples 3, 4, 5, were taken after 10 min, 90 min and 24 hrs of refluxing correspondingly. The isotherms for the samples calcined at 360° C. are shown in FIG. 7B.

Example No XV

Palladium Doped Zirconia as a Catalyst

A Heck reaction of the type shown below was effected in solution utilizing a zirconia-palladia catalyst described in Example No XI.

X = I, Br, Cl        stillbene        1,1-regioisomers

The catalyst described in details in the Example No XI and catalysts similar to that were heated at 390° C. for 24 hours to remove all organic. A phenyl halide (PhX) (see Table 4), 10 mmol, styrene (10 mmol), sodium acetate (11.2 mmol) and 10 ml of dimethylformamide (DMF) were added to the reaction vessel along with 2 mmol of naphthalene as an internal standard for GC analysis. The reaction vessel was then placed into an oil bath preheated at 80° C. and stirred vigorously. Small samples were removed periodically and subjected to GC analysis. The results are provided in Table 4. The products of the reaction were benzene, stilbene and no more than 3% 1,1-regioisomers.

TABLE 4

Conversion of Styrene to Stilbene by a $PdO—ZrO_2—PO_4$ Solid Catalysts Dispersed in DMF

| Catalyst | PhX | Styrene:PhX Ratio | Time [min] | Maximum rate $[mol \cdot l^{-1} \cdot min^{-1}] \times 10^2$ | Conversion of PhX to Ph [%] | Conversion of styrene to stilbene [%] |
|---|---|---|---|---|---|---|
| IV-27C | PhI | 1:1 | 240 | 0.42 | 5.0 | 95 |
| IV-29B[a] | PhI | 1:1 | 350 | 0.21 | 1.0 | 98 |
| IV-36C[b] | PhI | 1:1 | 430 | 0.2 | 1.5 | 96 |
| IV-27C[c] | PhBr | 1:6 | 180 | 0.4 | 2 | 98 |

[a]sample treated hydrothermally. Maximum pore size ~20 Å compared to ~18 Å for 27° C.
[b]catalyst contained no phosphate
[c]reaction temperature 140° C.

The times listed in the table are those at which no further change in composition was observed. These results show that the catalyst was highly selective for stilbene formation.

Example No XVI

Hydrodechlorination by $NiO—ZrO_2$

Preliminary results for the hydrodechlorination of chlorobenzene have been obtained using nickel reduced $Ni—ZrO_2$ samples to which had been added ammonium dihydrogenphosphate during the preparation of the samples. The material obtained was further hydrothermally treated at 180° C. The conditions were optimized at catalyst reduction at 400° with an increased $H_2$ flow of 4.92 L/h and in the reaction an $H_2$ flow of 6.13 L/h and $C_6H_5Cl:H_2=1:40$. The $Ni—ZrO_2$ catalyst yielded the conversion percent to benzene up to 98%.

Example No XVII

The Effect of Washing on the Material Porosity

The starting solution for the synthesis of the Samples had the following composition: 13.08 g of $Mn(CH_3COO)_2 \cdot 4H_2O$, 53.13 g of $Si(OC_2H_5)_4$, 1.79 g of $Al(OCH(CH_3)C_2H_5)_3$, 19.14 g hexylamine. To prepare the Sample 1.40 g of $H_2O$ were added to 28.06 g of the starting solution. The solution obtained was aged for 24 hrs and the Sample A dried as made at 130° C. 15.28 g of gel A were washed in propanol and centrifuged three times yielding the Sample B. The porosity of the samples obtained was characterized via argon adsorption. The samples A and B gave correspondingly 628.4 and 544.9 $m^2/g$ NLDFT desorption surface area with the latter having the pore size distribution much better refined around 16.8 Å.

Although others have produced a large number of porous oxides starting with metal chlorides dissolved in alcohol, the products templated with polyoxo block copolymers had pores in excess of 10 nm, as noted by C. L. Carnes, et al. in "Synthesis, Characterization and Adsorption Studies of Nanocrystalline Aluminum Oxide and a Bimetallic Nanocrystalline Aluminum Oxide/Magnesium Oxide", *Chem. Mater.* Vol. 14, 2922-29 (2002). The same was true for the mixed oxides. The present inventive process is a beginning towards producing supermicroporous oxides routinely.

Further, the pore size distribution can be tailored by using a wide variety of methods including, but not necessarily limited to, the choice of the solvent; the amount of solvent; the choice of the amine; the amount of amine; the amount of water; the time of reaction; the time of refluxing; the time of hydrothermal treatment; the calcination temperature; and the time of calcinations. In one non-limiting preparation embodiment, the solid is washed prior to collecting and drying it to form the supermicroporous metal oxide, and tailoring the pore size distribution is effected via choice of the washing agent or absence thereof. Suitable washing agents include, but are not necessarily limited to alcohols such as methanol, ethanol, propanol, ethyl acetate, dioxane and the like. Additionally, as noted, providing for the presence of mesopores in the supermicroporous material may enhance its catalytic properties due to improved diffusion as compared with an otherwise identical catalyst absent mesopores.

In the foregoing specification, the invention has been described with reference to specific embodiments thereof, and has been demonstrated as effective for producing supermicroporous metal oxides. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of metal acetates, alcohols and amine templates falling within the claimed parameters, but not specifically identified or tried in a particular method to make supermicroporous metal oxides herein, are anticipated to be within the scope of this invention. It is anticipated that the compositions of this invention may also supermicroporous metal oxides having particular utility as catalysts, in separation methods and in ion exchange techniques.

We claim:

1. A method for preparing supermicroporous metal oxides comprising:
   combining at least one metal salt in the presence of a carboxyl anion to form a mixture;
   adding to the mixture an amine to form either a homogeneous solution or a thixotropic gel;
   hydrolyzing the mixture by utilizing water present in the reagents and/or adding water/water diluted with solvent to the mixture;
   stirring and/or refluxing the mixture; and
   collecting and drying the solid from the mixture to form a supermicroporous metal oxide.

2. The method of claim 1 where the resulting supermicroporous metal oxide has pores within the range of about 8 to about 25 Å.

3. The method of claim 1 where the resulting supermicroporous metal oxide has pores within the range of about 10 to about 20 Å.

4. The method of claim 1 where the metal salt is selected from the group consisting of titanium acetate, vanadium acetate, vanadium phosphate, vanadium sulfate, chromium acetate, chromium nitrate, nickel acetate, nickel nitrate, manganese acetate, iron acetate, copper acetate, cobalt acetate, cobalt nitrate, cobalt chloride, zinc acetate, zirconium acetate, niobium acetate, molybdenum acetate, lanthanum acetate, aluminum acetate, tetraethyl orthosilicate, zirconium propoxide, zirconium isopropoxide, zirconium oxochloride, titanium isopropoxide, aluminum nitrate, aluminum tri-sec-butoxide, aluminum chloride, and mixtures thereof.

5. The method of claim 1 where the solvent is selected from the group consisting of acetone, methanol, ethanol, propanol, isopropanol, butanol, hexanol, pentanol, heptanol and mixtures thereof.

6. The method of claim 1 where the amine is selected from the group consisting of amines having from 1 to 18 carbon atoms.

7. The method of claim 1 where the amine is selected from the group consisting of methylamine, ethylamine, propylamine, butylamine, hexylamine, octylamine, trimethylammonium compounds, tetrabutylammonium compounds, dipropylamine, diethylamine, tripropylamine, and mixtures thereof.

8. The method of claim 1 where the drying is conducted in the range of about 45 to about 200° C.

9. The method of claim 1 further comprising treating the mixture hydrothermally in addition to stirring or refluxing.

10. The method of claim 1 further comprising aging the thixotropic gel for periods of time between about 10 min and about 96 hours prior to reflux.

11. The method of claim 1 where the ratio of solvent to amine ranges from about 0.1:8.0 to about 200:1.

12. The method of claim 1 further comprising adding a phosphate or sulfate to the mixture to improve the stability of the supermicroporous metal oxide and/or to alter its ion-exchange and/or catalytic properties.

13. The method of claim 1 further comprising calcining the metal oxide at a temperature in the range of from about 190 to about 950° C.

14. A method for tailoring the pore size distribution of supermicroporous metal oxides prepared by the method comprising:
    combining at least one metal salt in the presence of an acetate to form a mixture;
    adding to the mixture an amine to form either a homogeneous solution or a thixotropic gel;
    hydrolyzing the mixture by utilizing water present in a reagent and/or adding water diluted with solvent to the mixture;
    stirring and/or refluxing the mixture;
    treating the mixture hydrothermally; and
    collecting and drying the solid from the mixture to form a supermicroporous metal oxide;
    where tailoring the pore size distribution is accomplished by a method selected from the group consisting of:
        the choice of the solvent;
        the amount of solvent;
        the choice of the amine;
        the amount of amine;
        the amount of water;
        a time of reaction;
        the time of refluxing;
        the time of hydrothermal treatment;
        the calcination temperature; and
        the time of calcinations.

15. The method of claim 14 where tailoring the pore size distribution in the supermicroporous metal oxides is effected via choice of the solvent.

16. The method of claim 14 where tailoring the pore size distribution in the supermicroporous metal oxides is effected via choice of the amount of solvent used.

17. The method of claim 14 where tailoring the pore size distribution in the supermicroporous metal oxides is effected via choice of the amine.

18. The method of claim 14 where tailoring the pore size distribution in the supermicroporous metal oxides is effected by the change of the concentration of amine.

19. The method of claim 14 where tailoring the pore size distribution in the supermicroporous metal oxides is effected via altering the amount of water added.

20. The method of claim 14 where tailoring the pore size distribution in the supermicroporous metal oxides is effected via time of reaction.

21. The method of claim 14 where tailoring the pore size distribution in the supermicroporous metal oxides is effected via time of refluxing.

22. The method of claim 14 where tailoring the pore size distribution in the supermicroporous metal oxides is effected via time of hydrothermal treatment.

23. The method of claim 14 where the solid is washed prior to collecting and drying it to form the supermicroporous metal oxide, and tailoring the pore size distribution is effected via choice of the washing agent or absence thereof.

24. The method of claim 14 further comprising providing for presence of mesopores in the supermicroporous material to enhance its catalytic properties due to improved diffusion as compared with an otherwise identical catalyst absent mesopores.

* * * * *